C. E. L. LIPMAN.
AIR GAGE APPLIANCE.
APPLICATION FILED JUNE 8, 1914.
1,142,772.
Patented June 8, 1915.
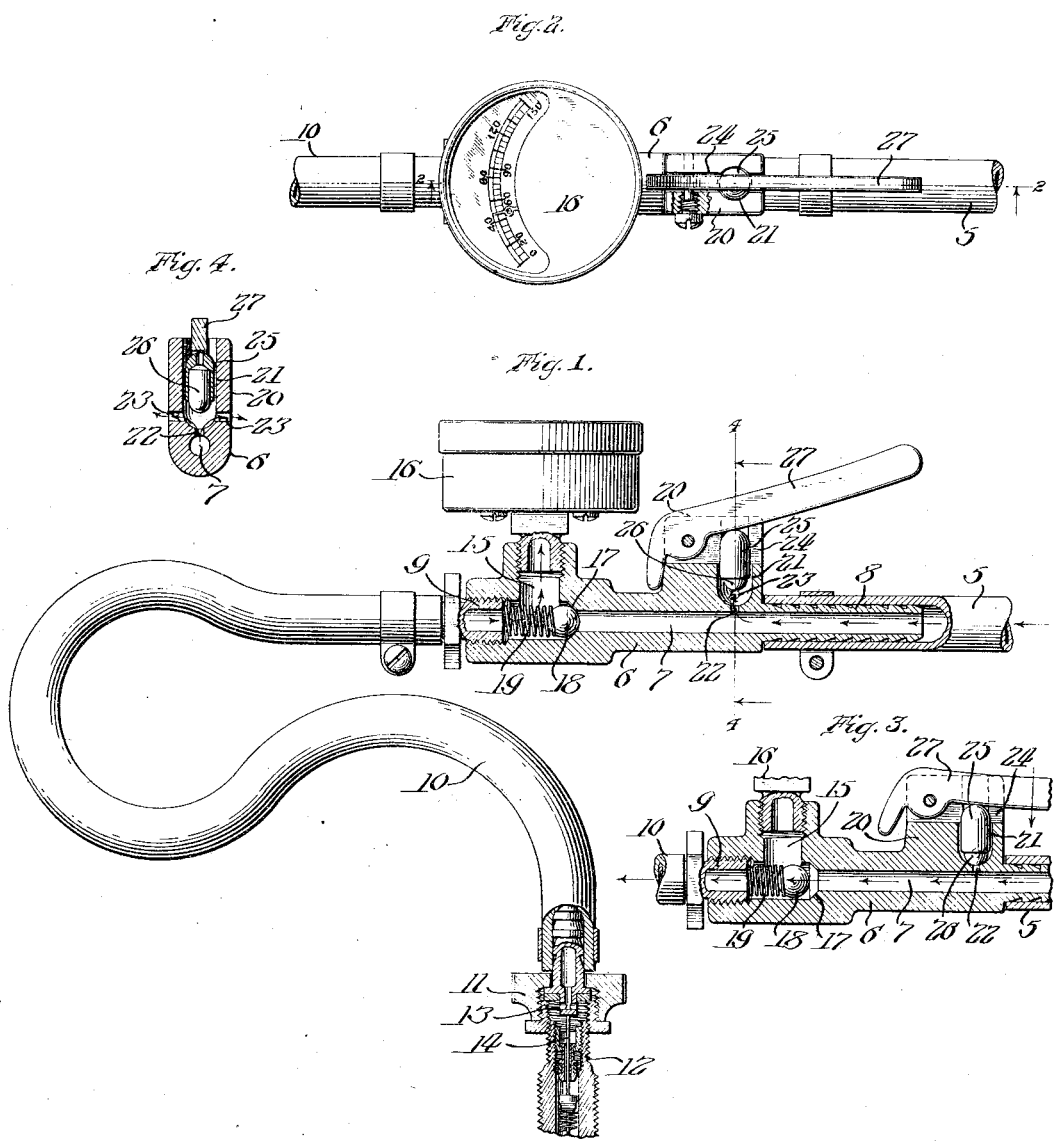
Witnesses:
W. L. Dow
John F. McCaw
Inventor:
Carl E. L. Lipman
By Pond & Wilson,
Atty.

UNITED STATES PATENT OFFICE.

CARL E. L. LIPMAN, OF BELOIT, WISCONSIN, ASSIGNOR TO LIPMAN AIR APPLIANCE COMPANY, OF BELOIT, WISCONSIN, A CORPORATION OF WISCONSIN.

AIR-GAGE APPLIANCE.

1,142,772.  Specification of Letters Patent.  Patented June 8, 1915.

Application filed June 8, 1914. Serial No. 843,734.

*To all whom it may concern:*

Be it known that I, CARL E. L. LIPMAN, a citizen of the United States, residing at Beloit, in the county of Rock and State of Wisconsin, have invented certain new and useful Improvements in Air-Gage Appliances, of which the following is a specification.

This invention relates to air gage appliances adapted for indicating the pressure of and controlling air under pressure, particularly of air used for inflating tires or replenishing air tanks or reservoirs where it is desired to supply the same with a predetermined pressure of air.

Portable air pumping mechanism comprising an air pump and power driven means therefor, are very extensively used for furnishing air under pressure for various uses, and are particularly desirable for inflating pneumatic tires. Air pumping units of this character are generally equipped with an electric motor as the power means for operating the air pump; and it is manifestly desirable to employ as small a motor as possible, capable of operating the pump for a given capacity, so that the cost of manufacture of the mechanism will be small. When the supply pipe or hose of a pumping mechanism is connected to a tire which is partially deflated and the motor started, it is necessary that the motor be capable of starting the pumping mechanism against the tire pressure, which will require much more power initially than when its normal running speed is attained; therefore a comparatively large motor is required.

An object of my invention is to provide an appliance adapted for use with an air pumping mechanism of the above described character, which will permit a minimum sized motor to be used.

Another object of my invention is to provide an air supplying device of the above character with means for controlling the passage of supplying air automatically for rendering the supply inoperative, and manually for rendering it operative.

It is customary and desirable to use an air pressure gage with an air-supply hose adapted to be connected with a source of air supply and to a tire, for the purpose of ascertaining the pressure of air in the tire during inflating thereof, so that when a predetermined pressure is attained the inflating process may be discontinued. The air passageway through the standard tire-valve in general use is small, thereby causing considerable resistance to passage of air therethrough. It is manifest, therefore, that when inflating a tire the pressure of the supplying air which is greater than that in the tire, will be indicated by the pressure gage; whereas the actual air pressure in the tire is of a much lesser degree than that indicated by the gage.

An object of my invention is to provide means for obviating this erroneous pressure indication, and for indicating the actual air pressure in a tire.

A further object is to provide a pressure gage appliance of the character described, the operation of which will insure against over inflating of a tire, which causes excessive strain both upon the tire and the air supplying means.

Referring to the drawings, Figure 1 is a view showing my improved pressure gage appliance attached to a tire valve, the valve mechanisms of the appliance being shown in section and in normal position. Fig. 2 is a plan view of Fig. 1. Fig. 3 is a sectional view similar to the upper portion of Fig. 1, showing the air discharge closed; and Fig. 4 is a transverse sectional view taken on the line 4—4 of Fig. 1.

On the drawings I have shown a hose or conduit designated by the reference character 5, which conduit is assumed to lead to a source of continuous air supply of a desired pressure, such as a power driven pump above mentioned. A valve casing 6 provided with a passage 7 extending longitudinally therethrough has one end 8 formed to receive the hose 5 and its opposite end screw-threaded to receive the threaded portion 9 of the flexible hose connection 10. This hose connection is equipped at its opposite end with a discharge cap 11 which is adapted to screw onto a tire-valve 12, and is provided with an internally disposed head 13 adapted to contact the valve-stem 14 and unseat the valve in the manner illustrated in Fig. 1. The discharge cap can, of course, be made suitable for whatsoever type of valve the chamber to be filled is provided with. The casing 6 is provided adjacent its threaded end, with a passage 15 leading transversely from the longitudinal passage 7; and an air pressure gage 16 of any suitable or preferred type is mounted on casing 6, screw-threaded therewith and in connection with the passage 15. The passage 7 adjacent the passage 15 is enlarged to form a valve-seat 17 upon which a ball-valve 18 is held seated by an expansion spring 19. By this construction it will be seen that the passage of air from the intake end of the conduit 7 to the pressure gage is normally stopped by a yieldable valve, and that the air at the intake side of this valve will unseat the valve and pass the same when it reaches a pressure sufficient to overcome the spring resistance of the valve.

The casing 6 is formed with a lateral extension 20 which is provided with a cylindrical opening 21 transverse to passage 7, the base of which opening forms a valve-seat to an opening 22 communicating the said cylindrical opening with passage 7. A pair of port outlets 23 establish communication between the cylindrical opening 21 adjacent its valve-seat, and the outer atmosphere. The extension 20 has its top slotted at 24, so as to intersect the cylindrical opening 21 and permit a plunger-valve 25 to be inserted in said cylindrical opening. This plunger-valve 25 comprises a metallic casing shaped to receive from one end a core 26 of suitable material, preferably rubber, the core being adapted to seat upon the lower end of the cylindrical opening 21 and close the opening 22. A lever 27 is located in said slot, pivotally mounted intermediate its ends, and is so shaped that one of its ends constitutes a handle which is adapted to rest upon the upper end of the plunger 25 which extends into the slot 20, whereby the handle may be operated to move the plunger valve, and its other end forms a stop to limit upward movement of the lever handle.

With the pressure gage appliance attached to a tire valve, and assuming air to be supplied continuously under pressure from hose 5, it will be seen that the supplying air which enters passage 7 will be stopped from further passage therethrough by the ball-valve 18 held yieldingly seated, and will be discharged from said passage through opening 22 by raising the plunger 25, and through the port outlets 23 to the outer atmosphere. Thus the supplying air under pressure is discharged from the casing before reaching the pressure gage; and furthermore, this discharge is automatically effected.

It is manifest that with an air pumping outfit as above described, including a pump and motor and pressure gage appliance, the discharge end of the supply hose leading from the pressure gage may be connected to a tire valve and the motor started without having to work against any more resistance than that which is necessary to merely operate the pump.

To inflate the tire the handle of the lever 27 would be depressed manually as shown in Fig. 3, thus closing opening 22, causing said supplying air to unseat the valve 18 and pass directly to the tire, the pressure of the supplying air being at the same time indicated by the gage.

When the gage appliance is in use for tire inflation, the resistance to the supplying air by the limited tire valve opening will cause the gage to indicate a higher pressure than is within the tire. To ascertain the actual pressure in the tire the lever 27 would be released by the operative, allowing the valve 18 to stop the passage of supplying air to the tire and gage, which supplying air would discharge from the casing, thus permitting the air in the tire to pass to the pressure gage.

With an appliance of this character an operative can, without giving attention to the source of air supply (which is continuous), govern very accurately the charging of a chamber with air to a predetermined pressure; and it will be noted that with the present embodiment of my invention the presence of the operative is required at the pressure gage during use of the appliance, thereby reasonably assuring that attention will be given to the amount of air being pumped so that pressure will not be furnished above the amount that is desired.

While I have shown and described a preferred embodiment of my invention, I do not desire to limit myself to the specific embodiment shown, since various changes in the structure thereof may be resorted to without departing from the spirit of the invention or sacrificing any of its material advantages.

I claim as my invention:

1. A device of the character described, comprising a flexible conduit adapted to be connected at one end with an air pressure pump, a coupling carried by the other end of said conduit for attaching the conduit to a tire-nipple, said coupling being provided with means for retaining the nipple-valve in open position when attached to a nipple, a valve-casing disposed in said conduit intermediate the ends thereof, a check-valve arranged in said casing so as to permit flow of air through said conduit toward the tire only, a pressure gage connected with said casing in proximity to said valve but between said valve and the tire connection and normally disposed in a horizontal position so that the tire pressure may at all times be ascertained from said gage, an upwardly disposed socket formed in said casing adjacent to said gage between said check-valve and the source of air supply and provided with a port communicating with the interior of said casing, a valve slidably positioned in said socket in position to close said port, said valve being normally unseated by the pressure within the casing so as to release the pressure in the supply end of the conduit, and a manually operable handle pivoted adjacent said gage and extending over said valve in position to force said valve against its seat when the handle is depressed thereby causing the air under pressure to flow past said check-valve into the tire, said handle being provided with means for preventing displacement of said valve from its socket.

2. A device of the character described, comprising a flexible conduit adapted to be connected at one end with an air pressure pump, a coupling carried by the other end of said conduit for attaching the conduit to a tire-nipple, a casing disposed in said conduit intermediate the ends thereof, a check valve arranged in said casing so as to permit flow of air through said conduit toward the tire only, a pressure gage connected to said casing in proximity to said valve but between said valve and the tire connection, an upwardly disposed socket formed in said casing adjacent to said gage between said check valve and the source of air supply and provided with a port communicating with the interior of said casing, a valve disposed in said socket and substantially inclosed to preclude the entrance of dirt into the casing, said valve being adapted to close said port and being normally unseated by pressure within the casing, and a manually operable handle pivoted to said casing in position to close said valve when the handle is depressed to thereby cause the air under pressure to flow past said check valve into the tire.

CARL E. L. LIPMAN.

Witnesses:
W. H. ARNOLD,
T. D. WOOLSEY.